(12) United States Patent
Kim et al.

(10) Patent No.: US 11,811,055 B2
(45) Date of Patent: Nov. 7, 2023

(54) MULTI-LAYERED ANODE CONTAINING SILICON-BASED COMPOUND AND LITHIUM SECONDARY BATTERY INCLUDING THE SAME

(71) Applicant: LG Chem, Ltd., Seoul (KR)

(72) Inventors: Dong Hwi Kim, Daejeon (KR); Tae Hee Kim, Daejeon (KR); Nanji Yun, Daejeon (KR); Yojin Kim, Daejeon (KR); Hyunkyung Do, Daejeon (KR)

(73) Assignee: LG Energy Solution, Ltd.

( * ) Notice: Subject to any disclaimer, the term of this patent is extended or adjusted under 35 U.S.C. 154(b) by 723 days.

(21) Appl. No.: 16/968,779

(22) PCT Filed: Oct. 2, 2019

(86) PCT No.: PCT/KR2019/012959
§ 371 (c)(1),
(2) Date: Aug. 10, 2020

(87) PCT Pub. No.: WO2020/071814
PCT Pub. Date: Apr. 9, 2020

(65) Prior Publication Data
US 2020/0403231 A1  Dec. 24, 2020

(30) Foreign Application Priority Data

Oct. 2, 2018 (KR) .................. 10-2018-0117681
Jul. 29, 2019 (KR) .................. 10-2019-0091864

(51) Int. Cl.
| | | |
|---|---|---|
| H01M 4/36 | (2006.01) | |
| H01M 4/133 | (2010.01) | |
| H01M 4/48 | (2010.01) | |
| H01M 4/587 | (2010.01) | |
| H01M 4/62 | (2006.01) | |
| H01M 10/0525 | (2010.01) | |
| H01M 4/02 | (2006.01) | |

(52) U.S. Cl.
CPC ........... *H01M 4/366* (2013.01); *H01M 4/133* (2013.01); *H01M 4/364* (2013.01); *H01M 4/483* (2013.01); *H01M 4/587* (2013.01); *H01M 4/622* (2013.01); *H01M 4/625* (2013.01); *H01M 10/0525* (2013.01); *H01M 2004/021* (2013.01); *H01M 2004/027* (2013.01)

(58) Field of Classification Search
CPC ...... H01M 4/366; H01M 4/133; H01M 4/364; H01M 4/483; H01M 4/587; H01M 4/622; H01M 4/625; H01M 10/0525; H01M 2004/021; H01M 2004/027; H01M 4/131; H01M 4/134; H01M 4/621; H01M 10/052; Y02E 60/10
USPC ......................................................... 429/217
See application file for complete search history.

(56) References Cited

U.S. PATENT DOCUMENTS

| | | | |
|---|---|---|---|
| 6,887,617 B2 | 5/2005 | Sato et al. | |
| 10,608,247 B2 | 3/2020 | Park et al. | |
| 2014/0023921 A1 | 1/2014 | Lee et al. | |
| 2016/0204422 A1 | 7/2016 | Wang et al. | |
| 2016/0204428 A1 | 7/2016 | Sugawara | |
| 2017/0125806 A1 | 5/2017 | Wang et al. | |
| 2018/0062158 A1 | 3/2018 | Kim et al. | |
| 2018/0062175 A1* | 3/2018 | Choi | H01M 4/366 |
| 2018/0219217 A1 | 8/2018 | Park et al. | |
| 2019/0305308 A1 | 10/2019 | Lee et al. | |
| 2022/0102708 A1 | 3/2022 | Wang et al. | |
| 2022/0328833 A1 | 10/2022 | Lee et al. | |

FOREIGN PATENT DOCUMENTS

| | | |
|---|---|---|
| CN | 106328898 A | 1/2017 |
| CN | 106450156 A | 2/2017 |
| CN | 106797020 A | 5/2017 |
| CN | 113875049 A | 12/2021 |
| JP | 2001307716 A | 11/2001 |
| JP | 2008258055 A | 10/2008 |
| JP | 2015106563 A | 6/2015 |
| KR | 20090079501 A | 7/2009 |
| KR | 20150032273 A | 3/2015 |
| KR | 20160087121 A | 7/2016 |
| KR | 20170111288 A | 10/2017 |
| KR | 20170111725 A | 10/2017 |
| KR | 20180035693 A | 4/2018 |
| KR | 20180072112 A | 6/2018 |

(Continued)

OTHER PUBLICATIONS

Search report from International Application No. PCT/KR2019/012959, dated Feb. 3, 2020.
Extended European Search Report for Application No. 19868950.7 dated Jun. 1, 2021, 4 pages.

(Continued)

*Primary Examiner* — Gary D Harris
(74) *Attorney, Agent, or Firm* — Lerner David LLP

(57) ABSTRACT

The present disclosure relates to an anode for a lithium secondary battery and a lithium secondary battery including the same, wherein the anode includes an anode current collector; a first anode active material layer formed on at least one surface of the anode current collector and containing a mixture of natural graphite and artificial graphite in a weight ratio of 13~34:66~87 and a first binder as the anode active material; and a second anode active material layer formed on the first anode active material layer and containing a mixture of artificial graphite and a silicon-based compound in a weight ratio of 91~99:1~9 and a second binder as the anode active material.

16 Claims, No Drawings

(56) References Cited

FOREIGN PATENT DOCUMENTS

WO     2015026559 A1    2/2015
WO     2018062836 A2    4/2018

OTHER PUBLICATIONS

Search Report dated Nov. 16, 2022 from the Office Action for Chinese Application No. 201980013160.0 dated Nov. 30, 2022, pp. 1-3. [See p. 1, categorizing the cited references].

* cited by examiner

MULTI-LAYERED ANODE CONTAINING SILICON-BASED COMPOUND AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2019/012959, filed Oct. 2, 2019, which claims priority to Korean Patent Applications No. 10-2018-0117681 filed on Oct. 2, 2018 and No. 10-2019-0091864 filed on Jul. 29, 2019, the disclosures of which are incorporated herein by reference.

TECHNICAL FIELD

The present disclosure relates to a multi-layered anode containing a silicon-based compound, and a lithium secondary battery including the same.

BACKGROUND OF ART

Technological development and increased demand for mobile equipment such as mobile communication devices, notebook computers, video cameras, and cordless phones have led to a rapid increase in the demand for secondary batteries as energy sources. Among these secondary batteries, lithium secondary batteries having high energy density and voltage, long lifespan and low self-discharge are commercially available and widely used.

In addition, increased interest in environmental issues has brought a great deal of researches associated with electric vehicles (EVs) and hybrid electric vehicles (HEVs) as substitutes for vehicles using fossil fuels such as gasoline vehicles and diesel vehicles which are main factors of air pollution. As a power source of such electric vehicles (EVs) and hybrid electric vehicles (HEVs), lithium secondary batteries having high energy density, high discharge voltage and output stability have been mainly studied and used.

As the lithium secondary battery is widely used, it is required to shorten a charging time in order to improve convenience of the battery, and high-rate discharging performance and high-rate charging performance have become important.

However, basic performance characteristics of the lithium secondary battery are greatly affected by anode materials. In order to maximize the performance of the battery, the anode active material requires the following conditions: electrochemical reaction potential should be close to a lithium metal, reaction reversibility with lithium ions should be high, and a diffusion rate of lithium ions in the active material should be fast. Graphite has been widely used as a material meeting these requirements. Considering excellent adhesion of natural graphite and excellent output and lifespan characteristics of artificial graphite, a mixture of natural graphite and artificial graphite has been used to improve the performance of various secondary batteries.

However, when using such a mixture, there was a problem that quick charging performance was lowered due to the natural graphite. In order to solve this problem and to secure stability, a multi-layered electrode has been proposed in which a section close to the current collector where adhesion is important is composed of a mixture of natural graphite and artificial graphite, and a section far from the current collector is composed of artificial graphite.

However, the above-described multi-layered anode also has characteristics limited only to graphite, so that the quick charging and stability cannot be improved to a desired level.

Accordingly, there is a high need for development of a lithium secondary battery having excellent thermal stability and improved quick charging and charging/discharging characteristics by solving the above problems.

DETAILED DESCRIPTION OF THE INVENTION

Technical Problem

The present invention has been made to solve the above problems and other technical problems that have yet to be resolved.

The present disclosure is to provide an anode including a first anode active material layer formed on a current collector and containing natural graphite and artificial graphite at a specific mixing ratio as the anode active material, and a second anode active material layer formed on the first anode active material layer and containing a silicon-based compound together with artificial graphite at a specific mixing ratio as the anode active material, thereby improving thermal stability and quick charging characteristics of a lithium secondary battery including the anode.

Technical Solution

According to an embodiment of the present disclosure, there is provided an anode for a lithium secondary battery including an anode current collector;

a first anode active material layer formed on at least one surface of the anode current collector and containing a mixture of natural graphite and artificial graphite in a weight ratio of 13~34:66~87 and a first binder as the anode active material; and a second anode active material layer formed on the first anode active material layer and containing a mixture of artificial graphite and a silicon-based compound in a weight ratio of 91~99:1~9 and a second binder as the anode active material.

According to another embodiment of the present disclosure, there are provided a lithium secondary battery including the above-described anode for a lithium secondary battery, and a device including the lithium secondary battery as a power source.

Advantageous Effects

As described above, the anode according to the present disclosure includes a first anode active material layer formed on a current collector and containing natural graphite and artificial graphite at a specific mixing ratio as the anode active material, and a second anode active material layer formed on the first anode active material layer and containing a silicon-based compound together with artificial graphite at a specific mixing ratio as the anode active material, thereby improving thermal stability and quick charging characteristics of a lithium secondary battery prepared by using the anode.

DETAILED DESCRIPTION OF THE EMBODIMENTS

Hereinafter, the present disclosure will be described in detail.

It should be understood that the terms used in the specification and claims should not be limited to general and dictionary meanings, but interpreted based on the meanings and concepts corresponding to technical aspects of the present disclosure based on the principle that the inventor is allowed to define terms in order to explain its own invention in the best way.

The terminology used herein is for the purpose of describing particular embodiments only and is not intended to be limiting of the invention. The singular forms are intended to include the plural forms as well, unless the context clearly indicates otherwise.

It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

According to an embodiment of the present disclosure, there is provided an anode for a lithium secondary battery including an anode current collector;

a first anode active material layer formed on at least one surface of the anode current collector and containing a mixture of natural graphite and artificial graphite in a weight ratio of 13~34:66~87 and a first binder as the anode active material; and a second anode active material layer formed on the first anode active material layer and containing a mixture of artificial graphite and a silicon-based compound in a weight ratio of 91~99:1~9 and a second binder as the anode active material.

That is, the anode according to the present disclosure increases contact force between the current collector and the anode active material, thereby ensuring stability and preventing deterioration of lifespan characteristics by mixing natural graphite excellent in adhesion with artificial graphite in the first anode active material layer in direct contact with the current collector.

In addition, the second anode active material layer formed on the first anode active material layer is located on a surface of the anode, and includes a silicon-based compound having a large capacity and containing a ceramic material together with artificial graphite having excellent output and lifespan characteristics, thereby improving thermal stability. Moreover, since the silicon-based compound participates in the reaction prior to the graphite during charging and discharging, it is possible to improve quick charging characteristics.

Herein, a mixing ratio of the natural graphite and the artificial graphite may be 13~34:66~87, specifically 20~30: 70~80 by weight.

When the content of the natural graphite is excessively increased out of the above range, output characteristics may be degraded. When the content of the natural graphite is too small, adhesion between the current collector and the active material layer may be lowered, so that an excessive amount of binder may be required, or a sudden decrease in lifespan characteristics may occur due to peeling of the active material layer during charging and discharging.

In addition, the artificial graphite and the silicon-based compound may be mixed in a weight ratio of 91~99:1~9, specifically, 95~99:1~5.

When the content of the silicon-based compound is too large out of the above range, the silicon-based compound may expand too much during charging and discharging and may act as a resistance, which may cause a problem that the resistance becomes too large. When the content of the silicon-based compound is too small, the effects of improving thermal stability and quick charging characteristics, which are desired effects of the present disclosure, cannot be obtained.

The silicon-based compound is not limited as long as it is a material containing Si. For example, it may be at least one selected from the group consisting of Si/C composite, $SiO_x$ (0<x<2), metal-doped $SiO_x$ (0<x<2), metal oxide-coated $SiO_x$ (0<x<2), $SiO_x/C$ (0<x<2), pure Si, and Si-alloy, and specifically a silicon-based oxide represented by the following Chemical Formula 1:

wherein 0<x<2.

More specifically, x may satisfy 0.1≤x≤1.2, and most particularly, x=1. This silicon-based oxide slightly increases resistance compared to artificial graphite. However, as the silicon-based oxide is contained in the second anode active material layer within the above range, thermal stability is improved by the application of Si, a ceramic material contained in the silicon-based oxide, and SiO participates in the reaction prior to artificial graphite during charging and discharging to improve quick charging characteristics, thereby exhibiting excellent battery performance.

For example, the Si/C composite may have a structure in which a carbon material is coated on a particle surface obtained by firing when carbon is bonded to silicon or silicon oxide particles, a structure in which carbon is dispersed in an atomic state inside silicon particles, or a structure such as the silicon/carbon composite of PCT International Application WO 2005/011030 by the present applicant. The present disclosure is not limited thereto, as long as it is a composite of carbon and silicon material.

The $SiO_x/C$ (0<x<2) may include a composite of silicon oxide and carbon, or a coated structure thereof.

In addition, the metal-doped $SiO_x$ (0<x<2) may be doped with at least one metal selected from the group consisting of Li, Mg, Al, Ca, Fe, and Ti.

When doped as described above, an initial efficiency of the $SiO_x$ material may be increased by reducing $SiO_2$ phase, which is irreversible of the $SiO_2$ material, or by converting it into an electrochemically inactive metal-silicate phase.

The metal oxide-coated $SiO_x$ (0<x<2) may be coated with, for example, $Al_2O_3$, or $TiO_2$.

The Si-alloy is an alloy of Si with at least one metal selected from the group consisting of Zn, Al, Mn, Ti, Fe, and Sn, and a solid solution, an intermetallic compound, an eutectic alloy therewith may be included. However, the present disclosure is not limited thereto.

Meanwhile, a thickness ratio of the first anode active material layer and the second anode active material layer may be 30~50:50~70.

That is, the first anode active material layer containing the natural graphite only needs to improve adhesion of a specific section between the current collector and the active material, and thus, it is not necessary to be formed too thick. When the content of the natural graphite in the entire anode active material layer is increased, rather the overall performance of the secondary battery such as output characteristics, capacity, and lifespan characteristics may be reduced, which is not preferable.

However, when the first anode active material layer is applied too thin, the effect of improving adhesion with the current collector, which is intended by containing the natural graphite, may not be obtained.

Therefore, it is preferable that the first anode active material layer and the second anode active material layer have the thickness ratio within the above range. The thickness ratio may preferably be 35~45:55~65, more preferably 40:60.

The thickness ratio may be measured by SEM photographing a cross section in the thickness direction.

In addition, the binder contained in each anode active material layer is affected by the position of each layer, the active material contained, etc. That is, the type and content of the most suitable binder may be determined according to the fact that the adhesion between the current collector and the active material layer is significantly lower than the adhesion between the active material layers, and whether or not the secondary battery contains an active material having a large volume expansion during charging and discharging.

That is, the first binder and the second binder may be the same kind of compound, or different kinds of compounds. A content ratio of the first binder and the second binder may be the same or different from each other based on each anode active material layer.

Specifically, the first binder and the second binder are not limited as long as they are components that assist in binding between the active material and the conductive material, and examples thereof include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber (SBR), fluorine rubber, various copolymers, and the like. Specifically, they may be styrene-butadiene rubber (SBR).

Herein, the first anode active material layer and the second anode active material layer of the anode according to the present disclosure are the same in that they basically contain a large amount of artificial graphite, and the first binder and the second binder may specifically contain the same kind of compound in terms of adhesion between the anode mixture layers and process efficiency.

In addition, although the first anode active material layer includes artificial graphite and natural graphite, as described above, to slightly improve the adhesion, but the adhesion between the current collector and the active material layer is significantly lower than the adhesion between the active material layers. Therefore, it is preferable to increase the content of the binder to ensure excellent adhesion. On the other hand, the second anode active material layer contains a silicon-based compound having a large volume expansion during charging and discharging of the secondary battery, but the content thereof is 9 wt % or less. Accordingly, the silicon-based compound does not have a great influence and does not require adhesion with the current collector.

Herein, the first binder may be contained in 1.2 to 30 wt %, specifically 1.2 to 10 wt %, more specifically 1.2 to 5 wt % based on a total weight of the first anode active material layer, and the second binder may be contained in 1 to 25 wt %, specifically 1 to 10 wt %, more specifically 1 to 3 wt % based on a total weight of the second anode active material layer. The first binder and the second binder may be contained in a weight ratio of 1.3~1.7:1, specifically 1.5:1.

Meanwhile, the first anode active material layer and the second anode active material layer may further contain an electrically conductive material, and the conductive material may be contained in 1 wt % to 10 wt %, specifically 1 wt % to 5 wt %, more specifically 1 wt % to 3 wt % based on a total weight of the anode active material layer in each anode active material layer.

The conductive material is not particularly limited, as long as it has electrical conductivity without causing chemical changes in the battery. Examples of the conductive material include carbon blacks such as carbon black, acetylene black, ketjen black, channel black, furnace black, lamp black and thermal black; conductive fibers such as carbon fiber and metallic fiber; metallic powders such as carbon fluoride powder, aluminum powder and nickel powder; conductive whiskers such as zinc oxide and potassium titanate; conductive metal oxides such as titanium oxide; polyphenylene derivatives; and the like. Specifically, it may be carbon black.

In addition, each anode active material layer may optionally further include a filler. The filler is optionally used as a component to inhibit expansion of the cathode, and is not particularly limited as long as it is a fibrous material that does not cause chemical changes in the battery. For example, olefin-based polymers such as polyethylene and polypropylene; and fibrous materials such as glass fiber and carbon fiber may be used.

In addition, a thickener may be further contained, and the thickener may be contained in 1 wt % to 10 wt %, specifically 1 wt % to 5 wt %, more specifically 1 wt % to 3 wt % based on a total weight of the anode active material layer in each anode active material layer.

The thickener may be, for example, a cellulose polymer, polyethylene glycol, polyacrylamide, poly(N-vinyl amide), or poly(N-vinylpyrrolidone). The cellulose polymer may be at least one selected from the group consisting of carboxy methyl cellulose (CMC), methyl cellulose (MC), hydroxypropyl cellulose (HPC), methyl hydroxypropyl cellulose (MHPC), ethyl hydroxyethyl cellulose (EHEC), methyl ethylhydroxyethyl cellulose (MEHEC) and cellulose gum. More specifically, it may be carboxy methyl cellulose (CMC).

The anode current collector used as a substrate for forming the active material layers is not particularly limited as long as it has electrical conductivity without causing chemical changes in the battery. For example, it may be copper; stainless steel; aluminum, nickel; titan; sintered carbon; copper or stainless steel surface-treated with carbon, nickel, titan or silver; an aluminum-cadmium alloy; or the like.

A thickness of the current collector is not particularly limited, but may be 3 to 500 μm that is commonly applied.

The first anode active material layer and the second anode active material layer may be formed by various conventionally known methods, for example, by a die coating method, a slide-slot die coating method, a roll coating method, a dip coating method, a bar coating method, an electrospinning or spraying method, or a combination thereof. Specifically, both the first anode active material layer and the second anode active material layer may be formed by being sequentially applied by a die coating method, an electrospinning method, or an electrospraying method, or may be formed by being simultaneously applied by a slide-slot die coating method. Alternatively, the first anode active material layer may be formed by a roll or die coating method and the second anode active material layer may be formed by an electrospinning method or an electrospraying method. More specifically, they may be formed by being simultaneously applied by a slide-slot die coating method.

According to another embodiment of the present disclosure, provided is a lithium secondary battery including the above-described anode for a lithium secondary battery.

The lithium secondary battery may have a structure in which an electrode assembly including the anode, a cathode and a separator is embedded in a battery case with an electrolyte.

The cathode may be prepared, for example, by applying a cathode material mixed with a cathode active material and a binder onto a cathode current collector, and if necessary, a conductive material and a filler may be further added as described in the anode.

The cathode current collector may generally be formed to have a thickness of 3 to 500 μm. The cathode current collector is not particularly limited as long as it has electrical conductivity without causing chemical changes in the battery. For example, it may be stainless steel; aluminum, nickel; titanium; aluminum or stainless steel surface-treated with carbon, nickel, titanium or silver; or the like, and it may preferably be aluminum. The current collector may form fine irregularities on its surface to increase adhesive force of the cathode active material, and various forms such as a film, a sheet, a foil, a net, a porous body, a foam body, and a nonwoven fabric body may be used.

The cathode active material may be, for example, a layered compound such as lithium cobalt oxide ($LiCoO_2$), lithium nickel oxide ($LiNiO_2$), or a compound substituted with one or more transition metals; lithium manganese oxide such as $Li_{1+x}Mn_{2-x}O_4$ (wherein, x is 0~0.33), $LiMnO_3$, $LiMn_2O_3$, and $LiMnO_2$, lithium copper oxide such as $Li_2CuO_2$, vanadium oxide such as $LiV_3O_8$, $LiV_3O_4$, $V_2O_5$, and $Cu_2V_2O_7$; Ni-site type lithium nickel oxide such as $LiNi_{1-x}O_2$ (wherein, M is Co, Mn, Al, Cu, Fe, Mg, B, or Ga, x is 0.01 to 0.3); lithium manganese composite oxide such as $LiMn_{2-x}O_2$ (wherein, M is Co, Ni, Fe, Cr, Zn, or Ta, x is 0.01 to 0.1), and $Li_2Mn_3MO_8$ (wherein, M is Fe, Co, Ni, Cu, or Zn); $LiMn_2O_4$ in which a part of Li is substituted with an alkaline earth metal ion; disulfide compound; $Fe_2(MoO_4)_3$, and the like. However, the present disclosure is not limited thereto.

Examples of the binder, conductive material, filler and thickener are as described in the anode.

As the separator, an insulating thin film having high ion permeability and mechanical strength is used. A pore diameter of the separator is generally 0.01 to 10 μm, and a thickness is generally 5~300 μm. Examples of the separator include olefin-based polymers such as chemical-resistant and hydrophobic polypropylene, sheets or nonwoven fabrics made of glass fibers or polyethylene, and the like. When a solid electrolyte such as a polymer is used as an electrolyte, the solid electrolyte may also serve as the separator.

Alternatively, an SRS (Safety Reinforced Separator) separator in which a mixture of inorganic particles and a binder is coated on at least one surface of an olefin-based polymer may be used. Herein, specific details of the SRS separator are in application No. 10-2008-000552 by the present applicant.

The electrolyte may be a non-aqueous electrolyte containing a lithium salt. The non-aqueous electrolyte containing a lithium salt is composed of a non-aqueous electrolyte and lithium salt, and examples of the non-aqueous electrolyte include a non-aqueous organic solvent, an organic solid electrolyte, an inorganic solid electrolyte, and the like, but are not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, polymers containing a secondary dissociation group, and the like.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

The lithium salt is a material that is readily soluble in the non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, lithium imide, and the like.

The non-aqueous electrolyte may include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, in order to improve charging/discharging characteristics and flame retardancy, and the like. In some cases, a halogen-containing solvent such as carbon tetrachloride and ethylene trifluoride may be further added to give nonflammability, or carbon dioxide gas may be further added to improve high-temperature storage characteristics. FEC (Fluoro-Ethylene Carbonate), PRS (Propene sultone), and the like may be further added thereto.

In one specific example, the lithium salt such as $LiPF_6$, $LiClO_4$, $LiBF_4$, $LiN(SO_2CF_3)_2$, and the like is added to a mixed solvent of a cyclic carbonate such as EC and PC, which is a high-dielectric solvent, and a linear carbonate such as DEC, DMC and EMC, which is a low-viscosity solvent, to prepare a non-aqueous electrolyte containing a lithium salt.

The lithium secondary battery may be included as a power source of a device, or a battery module including the lithium secondary battery as a unit battery, and a battery pack including the battery module may be used as a power source.

The device may be, for example, a laptop computer, a net book, a tablet PC, a portable phone, an MP3, a wearable electronic device, a power tool, an electric vehicle (EV), a hybrid electric vehicle (HEY), a plug-in hybrid electric vehicle (PHEV), an electric bike (E-bike), an electric scooter (E-scooter), an electric golf cart, or an electric power storing system, but the present disclosure is not limited thereto.

Since the structure and manufacturing method of the battery module, battery pack, and device are known in the art, detailed description thereof will be omitted herein.

The present disclosure also provides an anode for a lithium secondary battery including an anode current collector;

a first anode active material layer formed on at least one surface of the anode current collector and containing an anode active material including a mixture of natural graphite and artificial graphite in a weight ratio of 13~34:66~87, and a first binder; and a second anode active material layer formed on the first anode active material layer and containing an anode active material including a mixture of artificial graphite and SiO in a weight ratio of 91~99:1~9, and a second binder.

In addition, each of the first anode active material layer and the second anode active material layer may further include a carbon-based material such as amorphous hard carbon, low crystalline soft carbon, carbon black, acetylene black, ketjen black, super P, graphene, and fibrous carbon; metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me:Mn, Fe, Pb, Ge; Me':Al, B, P, Si, a Group 1, Group 2 or Group 3 element of periodic table, halogen; $0 < x \leq 1$, $1 \leq y \leq 3$, $1 \leq z \leq 8$), lithium metal; lithium alloy; tin alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, a conductive polymer such as polyacetylene; a Li—Co—Ni-based material; titanium oxide; lithium titanium oxide; or the like in addition to the above materials.

Hereinafter, the present invention will be described in more detail with specific examples. However, these examples are for illustrative purposes only, and the invention is not intended to be limited by these examples.

Example 1

A mixture of artificial graphite and natural graphite at a weight ratio of 80:20 as an anode active material, SBR as a binder, CMC as a thickener and carbon black as a conductive material were mixed at a weight ratio of 95:3.0:1.0:1.0 by weight, and water was added thereto as a solvent to prepare a first anode slurry.

A mixture of artificial graphite and SiO at a weight ratio of 95:5 as an anode active material, SBR as a binder, CMC as a thickener and carbon black as a conductive material were mixed at a weight ratio of 95:2.0:2.0:1.0 by weight, and water was added thereto as a solvent to prepare a second anode slurry.

The first anode slurry and the second anode slurry were applied onto a copper foil having a thickness of 10 μm at a thickness ratio of 4:6 to a total thickness of 100 μm. It was pressed to have a porosity of 25% and dried at 130° C. for about 12 hours under vacuum to prepare an anode.

<Example 2> (when the Content of Natural Graphite is Changed)

An anode was prepared in the same manner as in Example 1, except that a mixture of artificial graphite and natural graphite at a weight ratio of 70:30 was used as an anode active material of the first anode slurry.

<Example 3> (when the Content of SiO is Changed)

An anode was prepared in the same manner as in Example 1, except that a mixture of artificial graphite and SiO at a weight ratio of 99:1 was used as an anode active material of the second anode slurry.

<Example 4> (when the Thickness Ratio is Changed)

An anode was prepared in the same manner as in Example 1, except that the first anode slurry and the second anode slurry were applied at a thickness ratio of 6:4 by a slide-slot coating method.

<Example 5> (when the Ratio of Binder is Changed)

An anode was prepared in the same manner as in Example 1, except that a first anode slurry and a second anode slurry were prepared as follows (the first binder:the second binder=2:1): A mixture of artificial graphite and natural graphite at a weight ratio of 80:20 as an anode active material, SBR as a binder, CMC as a thickener and carbon black as a conductive material were mixed at a weight ratio of 95:3.0:1.0:1.0 by weight, and water was added thereto as a solvent to prepare a first anode slurry. A mixture of artificial graphite and SiO at a weight ratio of 95:5 as an anode active material, SBR as a binder, CMC as a thickener and carbon black as a conductive material were mixed at a weight ratio of 95:1.5:2.5:1.0 by weight, and water was added thereto as a solvent to prepare a second anode slurry.

<Example 6> (when the Ratio of Binder is Changed)

An anode was prepared in the same manner as in Example 1, except that a first anode slurry and a second anode slurry were prepared as follows (the first binder:the second binder=1:1): A mixture of artificial graphite and natural graphite at a weight ratio of 80:20 as an anode active material, SBR as a binder, CMC as a thickener and carbon black as a conductive material were mixed at a weight ratio of 95:3.0:1.0:1.0 by weight, and water was added thereto as a solvent to prepare a first anode slurry. A mixture of artificial graphite and SiO at a weight ratio of 95:5 as an anode active material, SBR as a binder, CMC as a thickener and carbon black as a conductive material were mixed at a weight ratio of 95:3.0:1.0:1.0 by weight, and water was added thereto as a solvent to prepare a second anode slurry.

<Comparative Example 1> (not Two-Layered Structure and Containing No SiO)

A mixture of artificial graphite and natural graphite at a weight ratio of 80:20 as an anode active material, SBR as a binder, CMC as a thickener and carbon black as a conductive material were mixed at a weight ratio of 95:3.0:1.0:1.0 by weight, and water was added thereto as a solvent to prepare an anode slurry.

The anode slurry was applied onto a copper foil having a thickness of 10 μm to a total thickness of 100 μm. It was pressed to have a porosity of 25% and dried at 130° C. for about 12 hours under vacuum to prepare an anode.

<Comparative Example 2> (not Two-Layered Structure, but Containing SiO)

A mixture of artificial graphite, natural graphite and SiO at a weight ratio of 87.5:10:2.5 as an anode active material, SBR as a binder, CMC as a thickener and carbon black as a conductive material were mixed at a weight ratio of 95:3.0:1.0:1.0 by weight, and water was added thereto as a solvent to prepare an anode slurry.

The anode slurry was applied onto a copper foil having a thickness of 10 μm to a total thickness of 100 μm. It was pressed to have a porosity of 25% and dried at 130° C. for about 12 hours under vacuum to prepare an anode.

<Comparative Example 3> (Two-Layered Structure, but Containing No SiO)

An anode was prepared in the same manner as in Example 1, except that only the artificial graphite was used as an anode active material of the second anode slurry.

<Comparative Example 4> (Two-Layered Structure, but the Content of Natural Graphite is Out of the Range)

An anode was prepared in the same manner as in Example 1, except that a mixture of artificial graphite and natural graphite at a weight ratio of 60:40 was used as an anode active material of the first anode slurry.

<Comparative Example 5> (Two-Layered Structure, but the Content of Natural Graphite is Out of the Range)

An anode was prepared in the same manner as in Example 1, except that a mixture of artificial graphite and natural graphite at a weight ratio of 95:5 was used as an anode active material of the first anode slurry.

<Comparative Example 6> (Two-Layered Structure, but the Content of SiO is Out of the Range)

An anode was prepared in the same manner as in Example 1, except that a mixture of artificial graphite and SiO at a weight ratio of 85:15 was used as an anode active material of the second anode slurry.

<Experimental Example 1> (Thermal Stability Measurement)

An electrode assembly including one of the anodes prepared in Examples 1 to 3 and Comparative Examples 1 to 4, a polyethylene separator (Celgard, thickness: 20 μm), and a lithium metal as a counter electrode was placed in a case, and an electrolyte was injected into the case to prepare a coin-cell. The electrolyte was prepared by dissolving 1M of lithium hexafluorophosphate ($LiPF_6$) in an organic solvent consisting of ethylene carbonate, dimethyl carbonate and ethyl methyl carbonate at a volume ratio of 3:4:3.

Each coin-cell manufactured using one of the prepared anode active materials was charged at a current of 0.1 C. and decomposed in a charging state of SOC 100%. Thereafter, the anode obtained from each coin-cell and a new electrolyte were added to a DSC measuring cell, and thermal stability was measured by differential scanning calorimetry (HP (High pressure)-DSC, manufactured by Searam) while increasing the temperature from room temperature to 500° C. at 10 t/min. Thereafter, the temperature at which a maximum peak (main peak) with the largest heat flux appears is shown in Table 1 below.

TABLE 1

| | $1^{st}$ peak (main peak) temp(° C.) |
|---|---|
| Example 1 | 310 |
| Example 2 | 303 |
| Example 3 | 291 |
| Example 4 | 296 |
| Example 5 | 306 |
| Example 6 | 307 |
| Comparative Example 1 | 270 |
| Comparative Example 2 | 274 |
| Comparative Example 3 | 271 |
| Comparative Example 4 | 276 |
| Comparative Example 5 | 280 |
| Comparative Example 6 | 292 |

Referring to Table 1, it was confirmed that the thermal stability of the secondary battery using the anode according to the present disclosure is excellent. In addition, referring to Examples 1 and 4, it was confirmed that when the thickness of the first anode slurry is less than or equal to the thickness of the second anode slurry, a more excellent effect can be obtained. Referring to Examples 1, 5 and 6, it was confirmed that when the content ratio of the first binder and the second binder is 1.3~1.7:1, a better effect can be obtained.

Experimental Example 2

A cathode material mixture of 96 wt % of a cathode active material ($LiCoO_2$), 2 wt % of Super-P (conductive material), and 2 wt % of PVDF (binder) was added to NMP (N-methyl-2-pyrrolidone; solvent) to prepare a cathode slurry, and then the cathode slurry was applied onto an aluminum foil having a thickness of 10 μm to a total thickness of 100 μm. It was pressed to have a porosity of 25% and dried at 130° C. for about 12 hours under vacuum to prepare a cathode.

Secondary batteries were manufactured using the anodes prepared in the above Examples and Comparative Examples, the cathode, a polyethylene separator (Celgard, thickness: 20 μm), and a liquid electrolyte in which 1M of $LiPF_6$ was dissolved in a mixed solvent of ethylene carbonate, dimethylene carbonate, and diethyl carbonate at a ratio of 1:2:1.

The secondary batteries prepared above were charged at 1 C to 4.35 V/38 mA under constant current/constant voltage (CC/CV) conditions at 45° C., and then discharged at 2 C to 2.5 V under constant current (CC) conditions, and discharge capacity thereof was measured. This was repeated 1 to 1000 cycles, and a value calculated by (capacity after 1000 cycles/capacity after 1 cycle)×100 is shown in Table 2 below as a high temperature lifetime retention (%).

TABLE 2

| | $1^{st}$ discharge capacity (mAh) | $1000^{th}$ discharge capacity (mAh) | High-temp. lifetime retention (%) |
|---|---|---|---|
| Example 1 | 388.0 | 310.4 | 80 |
| Example 2 | 388.4 | 303.0 | 78 |
| Example 3 | 363.0 | 305.0 | 84 |
| Example 4 | 376.0 | 267.0 | 71 |

TABLE 2-continued

|  | 1st discharge capacity (mAh) | 1000th discharge capacity (mAh) | High-temp. lifetime retention (%) |
|---|---|---|---|
| Example 5 | 381.5 | 285.3 | 74 |
| Example 6 | 381.5 | 289.9 | 76 |
| Comparative Example 1 | 350.0 | 203.0 | 58 |
| Comparative Example 2 | 377.3 | 211.3 | 56 |
| Comparative Example 3 | 350.8 | 217.5 | 62 |
| Comparative Example 4 | 388.8 | 233.3 | 60 |
| Comparative Example 5 | 387.4 | 255.7 | 66 |
| Comparative Example 6 | 449.8 | 206.9 | 46 |

Referring to Table 2, it was confirmed that the high temperature lifetime retention of the secondary battery using the anode according to the present disclosure is excellent. In addition, referring to Examples 1 and 4, it was confirmed that when the thickness of the first anode slurry is less than or equal to the thickness of the second anode slurry, a more excellent effect can be obtained. Referring to Examples 1, 5 and 6, it was confirmed that when the content ratio of the first binder and the second binder is 1.3~1.7:1, a better effect can be obtained.

<Experimental Example 2> (Quick Charging Characteristics)

The time taken for charging the secondary batteries prepared in Experimental Example 2 up to SOC 80% by applying a current of 1.5 C-rate was measured. The results are shown in Table 3 below.

TABLE 3

|  | Time (min) |
|---|---|
| Example 1 | 20 |
| Example 2 | 31 |
| Example 3 | 36 |
| Example 4 | 32 |
| Example 5 | 37 |
| Example 6 | 34 |
| Comparative Example 1 | 58 |
| Comparative Example 2 | 55 |
| Comparative Example 3 | 53 |
| Comparative Example 4 | 51 |
| Comparative Example 5 | 47 |
| Comparative Example 6 | 41 |

Referring to Table 3, it was confirmed that the quick charging characteristics of the secondary battery using the anode according to the present disclosure are excellent. In addition, referring to Examples 1 and 4, it was confirmed that when the thickness of the first anode slurry is less than or equal to the thickness of the second anode slurry, a more excellent effect can be obtained. Referring to Examples 1, 5 and 6, it was confirmed that when the content ratio of the first binder and the second binder is 1.3~1.7:1, a better effect can be obtained.

Those skilled in the art will appreciate that various modifications, additions and substitutions are possible, without departing from the scope and spirit of the invention as disclosed in the accompanying claims.

The invention claimed is:

1. An anode for a lithium secondary battery, comprising an anode current collector;
a first anode active material layer formed on at least one surface of the anode current collector, wherein the first anode active material layer contains a mixture of natural graphite and artificial graphite in a weight ratio of 13 to 34:66 to 87 as the anode active material and a first binder; and
a second anode active material layer formed on the first anode active material layer, wherein the second anode active material layer contains a mixture of artificial graphite and a silicon-based compound in a weight ratio of 91 to 99:1 to 9 as the anode active material and a second binder.

2. The anode for a lithium secondary battery of claim 1, wherein the first anode active material layer contains the mixture of natural graphite and artificial graphite in a weight ratio of 20 to 30:70 to 80 as the anode active material, and
the second anode active material layer contains the mixture of artificial graphite and a silicon-based compound in a weight ratio of 95 to 99:1 to 5 as the anode active material.

3. The anode for a lithium secondary battery of claim 1, wherein the silicon-based compound is a silicon-based oxide represented by the following Chemical Formula 1:

$$SiO_x \qquad \text{[Chemical Formula 1]}$$

wherein 0<x<2.

4. The anode for a lithium secondary battery of claim 1, wherein a thickness ratio of the first anode active material layer to the second anode active material layer is 30 to 50:50 to 70.

5. The anode for a lithium secondary battery of claim 4, wherein the thickness ratio of the first anode active material layer to the second anode active material layer is 40:60.

6. The anode for a lithium secondary battery of claim 1, wherein the first binder and the second binder contain a same kind of a compound.

7. The anode for a lithium secondary battery of claim 1, wherein the first binder and the second binder are styrene-butadiene rubber (SBR).

8. The anode for a lithium secondary battery of claim 1, wherein the first binder is contained in 1.2 to 5 wt % based on a total weight of the first anode active material layer, and the second binder is contained in 1 to 3 wt % based on a total weight of the second anode active material layer.

9. The anode for a lithium secondary battery of claim 1, wherein a weight ratio of the first binder and the second binder is 1.3~1.7:1.

10. The anode for a lithium secondary battery of claim 9, wherein a weight ratio of the first binder and the second binder is 1.5:1.

11. The anode for a lithium secondary battery of claim 1, wherein both the first anode active material layer and the second anode active material layer further contain an electrically conductive material, and the conductive material is contained in 1 wt % to 3 wt % based on a total weight of the anode active material layer in each anode active material layer.

12. The anode for a lithium secondary battery of claim 11, wherein the conductive material contained in each anode active material layer is carbon black.

13. The anode for a lithium secondary battery of claim 1, wherein the first anode active material layer and the second anode active material layer further contain a thickener, and the thickener is contained in 1 wt % to 3 wt % based on a total weight of the anode active material layer in each anode active material layer.

14. The anode for a lithium secondary battery of claim 13, wherein the thickener contained in each anode active material layer is carboxymethyl cellulose (CMC).

15. A lithium secondary battery comprising the anode for a lithium secondary battery of claim 1.

16. An anode for a lithium secondary battery, comprising an anode current collector;

a first anode active material layer formed on at least one surface of the anode current collector wherein the first anode active material layer contains an anode active material comprising a mixture of natural graphite and artificial graphite in a weight ratio of 13~34:66~87, and a first binder; and a second anode active material layer formed on the first anode active material layer, wherein the second anode active material layer contains an anode active material comprising a mixture of artificial graphite and SiO in a weight ratio of 91 to 99:1 to 9, and a second binder.

* * * * *